US011070400B2

(12) United States Patent
Tang

(10) Patent No.: US 11,070,400 B2
(45) Date of Patent: Jul. 20, 2021

(54) METHOD FOR DETERMINING TRANSMISSION PARAMETERS OF UPLINK SIGNAL, TERMINAL AND NETWORK DEVICE

(71) Applicant: GUANGDONG OPPO MOBILE TELECOMMUNICATIONS CORP., LTD., Guangdong (CN)

(72) Inventor: Hai Tang, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/672,359

(22) Filed: Nov. 1, 2019

(65) Prior Publication Data

US 2020/0067739 A1 Feb. 27, 2020

Related U.S. Application Data

(63) Continuation of application No. PCT/CN2017/083083, filed on May 4, 2017.

(51) Int. Cl.
*H04W 72/04* (2009.01)
*H04L 25/02* (2006.01)
(Continued)

(52) U.S. Cl.
CPC ....... *H04L 25/0226* (2013.01); *H04B 7/0617* (2013.01); *H04B 7/0639* (2013.01);
(Continued)

(58) Field of Classification Search
CPC ............. H04L 25/0228; H04L 25/0226; H04L 5/0051; H04W 72/042; H04B 7/0617; H04B 7/0639
See application file for complete search history.

(56) References Cited

U.S. PATENT DOCUMENTS 9,572,063 B2  2/2017  Etemad et al.
10,666,334 B2  5/2020  Xiong et al.
(Continued)

FOREIGN PATENT DOCUMENTS

CN  101827444 A  9/2010
CN  101917765 A  12/2010
(Continued)

OTHER PUBLICATIONS

Huawei, HiSilicon; "UL SRS design for CSI acquisition and beam management", 3GPP TSG RAN WG1 Meeting #88bis, R1-1704241, Spokane, USA Apr. 3-7, 2017.
(Continued)

*Primary Examiner* — Wei Zhao
(74) *Attorney, Agent, or Firm* — Ladas & Parry, LLP

(57) ABSTRACT

Provided are methods for determining a transmission parameter of an uplink signal, a terminal and a network device. The method includes that: a terminal determines a first SRS resource set receives, from a network device, first indication information which is for instructing the terminal to transmit an aperiodic SRS, determines a target SRS resource set according to the first indication information and the first SRS resource set, sends the aperiodic SRS to the network device on an SRS resource in the target SRS resource set, receives, from the network device, second indication information which is for indicating a target SRS resource in the target SRS resource set; and the terminal determines a transmission parameter used to transmit an uplink signal according to the target SRS resource.

20 Claims, 4 Drawing Sheets

(51) Int. Cl.
H04B 7/06 (2006.01)
H04L 5/00 (2006.01)
H04W 80/02 (2009.01)

(52) U.S. Cl.
CPC ........ H04L 5/0051 (2013.01); H04L 25/0228 (2013.01); H04W 72/042 (2013.01); H04W 80/02 (2013.01)

(56) References Cited

U.S. PATENT DOCUMENTS

| 2011/0199944 | A1 | 8/2011 | Chen | |
|---|---|---|---|---|
| 2013/0028134 | A1 | 1/2013 | Wang | |
| 2013/0078913 | A1 | 3/2013 | Lee | |
| 2013/0121280 | A1 | 5/2013 | Ouchi | |
| 2013/0194908 | A1 | 8/2013 | Gao | |
| 2013/0223394 | A1 | 8/2013 | Nishio | |
| 2013/0322280 | A1 | 12/2013 | Pi | |
| 2014/0073356 | A1* | 3/2014 | Siomina | G01S 5/0205 455/456.2 |
| 2015/0018030 | A1* | 1/2015 | Park | H04W 52/04 455/522 |
| 2015/0163795 | A1 | 6/2015 | Nishio et al. | |
| 2015/0365213 | A1 | 12/2015 | Nishio et al. | |
| 2015/0365936 | A1 | 12/2015 | Nishio et al. | |
| 2016/0156442 | A1 | 6/2016 | Ouchi et al. | |
| 2016/0302191 | A1 | 10/2016 | Nishio et al. | |
| 2017/0347322 | A1 | 11/2017 | Lee et al. | |
| 2017/0359816 | A1 | 12/2017 | Nishio et al. | |
| 2019/0215780 | A1 | 7/2019 | Lee et al. | |
| 2019/0274132 | A1 | 9/2019 | Nishio et al. | |
| 2020/0145079 | A1* | 5/2020 | Marinier | H04B 7/0456 |

FOREIGN PATENT DOCUMENTS

| CN | 103138817 A | 6/2013 |
|---|---|---|
| CN | 103155472 A | 6/2013 |
| CN | 103210694 A | 7/2013 |
| CN | 106059737 A | 10/2016 |
| JP | 2011234298 A | 11/2011 |
| RU | 2551906 C2 | 6/2015 |
| WO | 2012093449 A1 | 7/2012 |
| WO | 2018201402 A1 | 11/2018 |

OTHER PUBLICATIONS

LG Electronics et al. "WF on codebook based transmission for UL", 3GPP TSG RAN1 #88bis, R1-1706444, Spokane, USA, Apr. 3-7, 2017.
LG Electronics et al. "WF on non-codebook based transmission for UL", 3GPP TSG RAN1 #88bis, R1-1706445, Spokane, USA, Apr. 3-7, 2017.
LG Electronics et al. "WF on aperiodic SRS triggering in NR", 3GPP TSG RAN1 #88bis, R1-1706446, Spokane, USA, Apr. 3-7, 2017.
First Office Action of the Russian application No. 2019137300, dated Aug. 20, 2020.
International Search Report in the international application No. PCT/CN2017/083083, dated Feb. 1, 2018.
Written Opinion of the International Search Authority in the international application No. PCT/CN2017/083083, dated Feb. 1, 2018 with English translation provided by Google Translate.
Supplementary European Search Report in the European application No. 17908706.9, dated Mar. 10, 2020.
English Translation of the Written Opinion of the International Search Authority in the international application No. PCT/CN2017/083083, dated Feb. 1, 2018.
First Office Action of the Canadian application No. 3063213, dated Dec. 15, 2020.
First Office Action of the Chilean application No. 201903129, dated Dec. 18, 2020.
First Office Action of the Chinese application No. 201911312508.4, dated Nov. 2, 2020, with search report.
Office Action of the Indian application No. 201917048425, dated Apr. 23, 2021.
First Office Action of the Japanese application No. 2019-559830, dated May 21, 2021.
ZTE, ZTE Microelectronics, "Discussion on SRS design for NR", 3GPP TSG RAN WG1 Meeting #88bis R1-1704414, Spokane, USA Apr. 3-7, 2017.
Guangdong Oppo Mobile Telecom, "On SRS design for NR", 3GPP TSG RAN WG1 Meeting #88bis R1-1704612, Spokane, USA, Apr. 3-7, 2017.
LG Electronics, "Discussion on UL beam management", 3GPP TSG RAN WG1 Meeting #88bis R1-1704878, Spokane, USA Apr. 3-7, 2017.
Notice of Authorization of the Chilean application No. 201903129, dated Mar. 16, 2021.

* cited by examiner

METHOD FOR DETERMINING TRANSMISSION PARAMETERS OF UPLINK SIGNAL, TERMINAL AND NETWORK DEVICE

CROSS-REFERENCE

This application is a continuation of PCT Application No. PCT/CN2017/083083, filed on May 4, 2017 and named after "METHOD FOR DETERMINING TRANSMISSION PARAMETERS OF UPLINK SIGNAL, TERMINAL AND NETWORK DEVICE", the contents of which are hereby incorporated by reference in its entirety.

BACKGROUND

In an existing communication system, a mechanism for transmitting an aperiodic Sounding Reference Signal (SRS) is introduced, and a base station may trigger a terminal through Downlink Control information (DCI) to transmit an aperiodic SRS. An SRS is transmitted to estimate uplink channel quality of different frequency bands such that a network device allocates a transmission resource in a relatively good transient channel state to a terminal for uplink signal transmission.

However, in the existing communication system, a large number of SRS resources are configured for transmission of an aperiodic SRS, and if the SRS is only configured for estimating a transient channel state, reasonability in use of the SRS resources is reduced to a certain extent to cause SRS resource waste.

SUMMARY

The application relates to the field of communications, and more particularly to a method for determining a transmission parameter of an uplink signal, a terminal and a network device.

Embodiments of the application provide methods for determining a transmission parameter of an uplink signal, a terminal and a network device, to reasonably use an SRS resource and reduce SRS resource waste.

A first aspect provides a method for determining a transmission parameter of an uplink signal, which includes that: a terminal determines a first SRS resource set; the terminal receives first indication information sent by a network device, the first indication information being used to instruct the terminal to transmit an aperiodic SRS; the terminal determines a target SRS resource set according to the first indication information and the first SRS resource set; the terminal sends the aperiodic SRS to the network device on an SRS resource in the target SRS resource set; the terminal receives second indication information sent by the network device, the second indication information being used to indicate a target SRS resource in the target SRS resource set; and the terminal determines a transmission parameter used to transmit an uplink signal according to the target SRS resource.

In the embodiments of the application, the terminal may determine the transmission parameter used to transmit the uplink signal according to the target SRS resource, so that the condition in a conventional art that an SRS resource may only be configured to transmit an SRS to estimate a channel state is avoided, the SRS resource may be reasonably used, and SRS resource waste is avoided.

Furthermore, the SRS is sent on the SRS resource in the target SRS resource set for channel estimation, the target SRS resource is determined, and the transmission parameter used for the terminal to transmit the uplink signal is determined according to the target SRS resource, so that improvement in accuracy of the transmission parameter determined by the terminal to transmit the uplink signal is facilitated.

In combination with the first aspect, in some possible implementation modes, the first indication information may be used to indicate the target SRS resource set, and the operation that the terminal determines the target SRS resource set according to the first indication information and the first SRS resource set may include that: the terminal determines the target SRS resource set from the first SRS resource set according to the first indication information, the target SRS resource set being a subset of the first SRS resource set.

In combination with the first aspect, in some possible implementation modes, the first indication information may be used to indicate a first SRS resource in the first SRS resource set, and the operation that the terminal determines the target SRS resource set according to the first indication information and the first SRS resource set may include that: the terminal determines the first SRS resource from the first SRS resource set according to the first indication information; and the terminal determines a second SRS resource set corresponding to the first SRS resource as the target resource set according to the first SRS resource and a corresponding relationship between each SRS resource in the first SRS resource set and a second SRS resource set.

In combination with the first aspect, in some possible implementation modes, different SRS resources in the first SRS resource set may correspond to different second SRS resource sets.

In combination with the first aspect, in some possible implementation modes, the first indication information may be used to indicate a second SRS resource in the first SRS resource set, and the operation that the terminal determines the target SRS resource set according to the first indication information and the first SRS resource set may include that: the terminal determines an index of the second SRS resource in the first SRS resource set according to the first indication information and the first SRS resource set; the terminal determines an index set corresponding to the second SRS resource according to the index of the second SRS resource in the first SRS resource set and a corresponding relationship between an index of an SRS resource in the first SRS resource set and an index set; and the terminal determines that each SRS resources indicated by each index in the index set corresponding to the second SRS resource forms the target SRS resource set.

In combination with the first aspect, in some possible implementation modes, different beams may be adopted for SRS transmission on different SRS resources in the first SRS resource set.

In combination with the first aspect, in some possible implementation modes, different beams may be adopted for SRS transmission on different SRS resources in the target SRS resource set.

In combination with the first aspect, in some possible implementation modes, the transmission parameter may be a beamforming weight, and the operation that the terminal determines the transmission parameter used to transmit the uplink signal according to the target SRS resource may include that: the terminal determines a beamforming weight for SRS transmission on the target SRS resource as the beamforming weight for transmission of the uplink signal.

In combination with the first aspect, in some possible implementation modes, the transmission parameter may be a precoding matrix, and the operation that the terminal determines the transmission parameter used to transmit the uplink signal according to the target SRS resource may include that: the terminal receives first Precoding Matrix Indicator (PMI) information sent by the network device; and the terminal determines the precoding matrix of the uplink signal through a mapping relationship among an antenna port amount, PMI information and a precoding matrix according to an antenna port amount of the target SRS resource and the first PMI information.

In combination with the first aspect, in some possible implementation modes, after the operation that the terminal determines the first SRS resource set, the method may further include that: the terminal sends an SRS to the network device on the SRS resource in the first SRS resource set.

In combination with the first aspect, in some possible implementation modes, the operation that the terminal transmits the SRS on the SRS resource in the first SRS resource set may include that: the terminal transmits the SRS on the SRS resource in the first SRS resource set, the SRS being a periodic SRS or a quasi-persistent SRS.

In combination with the first aspect, in some possible implementation modes, the operation that the terminal sends the SRS to the network device on the SRS resource in the first SRS resource set may include that: the terminal sends the SRS to the network device on part of antenna ports of the SRS resource in the first SRS resource set.

In combination with the first aspect, in some possible implementation modes, the operation that the terminal determines the first SRS resource set may include that: the terminal receives configuration information sent by the network device, the configuration information being for configuring the first SRS resource set for the terminal.

In combination with the first aspect, in some possible implementation modes, the configuration information may be born in high-layer signaling or Media Access Control (MAC) signaling.

In combination with the first aspect, in some possible implementation modes, the operation that the terminal receives the second indication information sent by the network device may include that: the terminal receives, from the network device, DCI used to schedule the uplink signal, the DCI containing the second indication information.

A second aspect provides a method for determining a transmission parameter of an uplink signal, which may include that: a network device receives an SRS sent by a terminal on an SRS resource in a first SRS resource set; the network device determines first indication information according to the SRS, the first indication information being further configured to determine a target SRS transmission resource; the network device sends the first indication information to the terminal, the first indication information being used to instruct the terminal to transmit an aperiodic SRS; the network device receives the aperiodic SRS from the terminal on an SRS resource in a target SRS resource set; the network device determines a transmission parameter used for the terminal to transmit an uplink signal according to the target SRS resource; and the network device sends second indication information to the terminal, the second indication information being used to indicate the target SRS resource in the target SRS resource set and the target SRS resource being configured to determine the transmission parameter used for the terminal to transmit the uplink signal.

In the embodiments of the application, the terminal may determine the transmission parameter used to transmit the uplink signal according to the target SRS resource, so that the condition in a conventional art that an SRS resource may only be configured to transmit an SRS to estimate a channel state is avoided, the SRS resource may be reasonably used, and SRS resource waste is avoided.

Furthermore, the SRS is sent on the SRS resource in the target SRS resource set for channel estimation, the target SRS resource is determined, and the transmission parameter used for the terminal to transmit the uplink signal is determined according to the target SRS resource, so that improvement in accuracy of the transmission parameter determined by the terminal to transmit the uplink signal is facilitated.

In combination with the second aspect, in some possible implementation modes, the first indication information may be used to indicate the target SRS resource set, and the target SRS resource set may be a subset of the first SRS resource set.

In combination with the second aspect, in some possible implementation modes, the first indication information may be used to indicate a first SRS resource in the first SRS resource set, each SRS resource in the first SRS resource set may correspond to a second SRS resource set, and the second SRS resource set corresponding to the first SRS resource may be the target SRS resource set.

In combination with the second aspect, in some possible implementation modes, the first indication information may be used to indicate a second SRS resource in the first SRS resource set, an index of the second SRS resource in the first SRS resource set may correspond to an index set, and each SRS resource corresponding to each index in the index set corresponding to the second SRS resource may form the target SRS resource set.

In combination with the second aspect, in some possible implementation modes, different beams may be adopted for SRS transmission on different SRS resources in the first SRS resource set.

In combination with the second aspect, in some possible implementation modes, different beams may be adopted for SRS transmission on different SRS resources in the target SRS resource set.

In combination with the second aspect, in some possible implementation modes, the transmission parameter may be a beamforming weight, and a beamforming weight for SRS transmission on the target SRS resource may be determined as the beamforming weight for transmission of the uplink signal.

In combination with the second aspect, in some possible implementation modes, the transmission parameter may be a precoding matrix, and the method may further include that: the network device sends first PMI information to the terminal, the first PMI information and an antenna port amount of the target SRS resource indicating the precoding matrix of the uplink signal through a mapping relationship among an antenna port amount, PMI information and a precoding matrix.

In combination with the second aspect, in some possible implementation modes, the operation that the network device receives the SRS from the terminal on the SRS resource in the first SRS resource set may include that: the network device receives the SRS from the terminal on the SRS resource in the first SRS resource set, the SRS being a periodic SRS or a quasi-persistent SRS.

In combination with the second aspect, in some possible implementation modes, the operation that the network device receives the SRS from the terminal on the SRS resource in the first SRS resource set may include that: the network device receives the SRS from the terminal on part of antenna ports of the SRS resource in the first SRS resource set.

In combination with the second aspect, in some possible implementation modes, the method may further include that: the network device sends configuration information to the terminal, the configuration information being for configuring the first SRS resource set for the terminal.

A third aspect provides a terminal, which includes units configured to execute the method in the first aspect.

A fourth aspect provides a network device, which includes units configured to execute the method in the second aspect.

A fifth aspect provides a terminal, which includes a memory, a processor, an input/output interface and a communication interface. The memory, the processor, the input/output interface and the communication interface form communication connections, the memory is configured to store an instruction, the processor is configured to execute the instruction stored in the memory, and when the instruction is executed, the processor executes the method in the first aspect through the communication interface and controls the input/output interface to receive input data and information and output data such as an operation result.

A sixth aspect provides a network device, which includes a memory, a processor, an input/output interface and a communication interface. The memory, the processor, the input/output interface and the communication interface form communication connections, the memory is configured to store an instruction, the processor is configured to execute the instruction stored in the memory, and when the instruction is executed, the processor executes the method in the second aspect through the communication interface and controls the input/output interface to receive input data and information and output data such as an operation result.

A seventh aspect provides a computer-readable medium, which stores a program code configured to be executed by a terminal device, the program code including an instruction configured to execute the method in each aspect.

An eighth aspect provides a computer program product including an instruction, which runs on a computer to enable the computer to execute the method in each aspect.

DETAILED DESCRIPTION

The technical solutions in the application will be described below in combination with the drawings.

Figure 1:
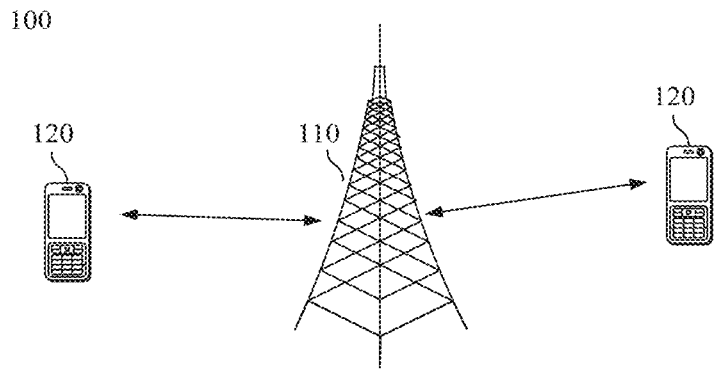
FIG. 1 is a wireless communication system 100 to which the embodiments of the application are applied.

FIG. 1 is a wireless communication system 100 to which the embodiments of the application are applied. The wireless communication system 100 may include a network device 110. The network device 110 may be a device capable of communicating with a terminal device. The network device 110 may provide communication coverage for a specific geographical region and may communicate with a terminal device in the coverage.

A network device and two terminals are exemplarily shown in FIG. 1. The wireless communication system 100 may include multiple network devices, and there may be other number of terminals, except two terminals, in coverage of each network device. There are no limits made thereto in the embodiments of the application.

The wireless communication system 100 may further include other network entities such as a network controller and a mobility management entity. There are no limits made thereto in the embodiments of the application.

It is to be understood that the technical solutions of the application may be applied to various communication systems, for example, a Global System of Mobile Communication (GSM), a Code Division Multiple Access (CDMA) system, a Wideband Code Division Multiple Access (WCDMA) system, a General Packet Radio Service (CPRS), an LTE system, an Advanced Long Term Evolution (LTE-A) system, a Universal Mobile Telecommunication System (UMTS), New Radio Access Technology (NR), and 5th-Generation (5G).

It is also to be understood that, in the embodiments of the application, the terminal device may include, but not limited to, a Mobile Station (MS), a mobile terminal, a mobile telephone, User Equipment (UE), a handset, portable equipment and the like. The terminal device may communicate with one or more core networks through a Radio Access Network (RAN). For example, the terminal device may be a mobile phone (or called a "cell" phone), a computer with a wireless communication function and the like. The terminal device may also be a portable, pocket, handheld, computer-embedded or vehicle-mounted mobile device.

In the embodiments of the application, the network device may be an access network device and, for example, may be a base station, a Transmit and Receive Point (TRP) or an access point. The base station may be a Base Transceiver Station (BTS) in the GSM or CDMA, may also be a NodeB in WCDMA, may also be an Evolved Node B (eNB or e-NodeB) in LTE or may further be a gNB in NR or 5G. There are no specific limits made thereto in the embodiments of the application.

In a 5G communication system, SRSs include periodic SRSs and quasi-persistent SRSs. A periodic SRS may be continuously transmitted on a periodic SRS resource. For a quasi-persistent SRS, a terminal may be controlled through activation and deactivation signaling to start or stop periodically transmitting the SRS.

An SRS may be configured to obtain Channel State Information (CSI), and may also be configured for beam management. That is, the terminal may adopt different beams to transmit SRSs on different SRS resources. A network device may detect the SRS to determine and indicate a SRS resource for the SRS with relatively high receiving quality to the terminal. The terminal may adopt the beam for the SRS for subsequent uplink signal transmission.

For obtaining an "optimal beam" for transmitting an uplink signal, the terminal is required to use multiple different beams to transmit SRSs, and thus a large number of SRS resources are required to be configured. How to efficiently and accurately select a transmission parameter (for example, beamforming weight) for the uplink signal by use of the SRS resources will be described.

Figure 2:
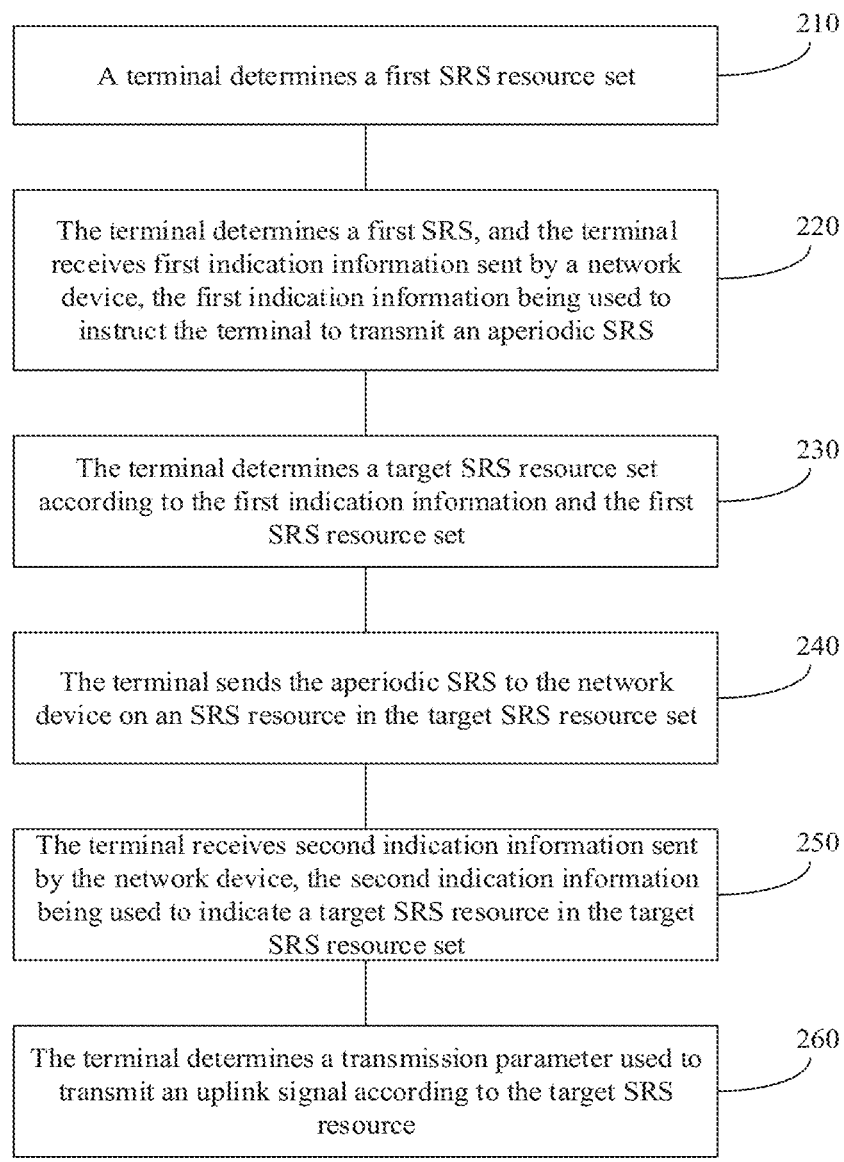
FIG. 2 is a schematic flowchart of a method for determining a transmission parameter of an uplink signal according to an embodiment of the application.

FIG. 2 is a schematic flowchart of a method for determining a transmission parameter of an uplink signal according to an embodiment of the application. The method shown in FIG. 2 includes the following operations.

In the operation 210, a terminal determines a first SRS resource set.

The first SRS resource set includes at least one SRS resource, and the SRS resource may be a transmission resource configured to transmit an SRS.

Different beams are adopted for SRS transmission on different SRS resources in the first SRS resource set.

In the operation 220, the terminal receives first indication information sent by a network device, the first indication information being used to instruct the terminal to transmit an aperiodic SRS.

The aperiodic SRS may refer to an aperiodically transmitted SRS.

The first indication information may be determined as a triggering instruction of triggering the terminal to transmit the aperiodic SRS.

In the operation 230, the terminal determines a target SRS resource set according to the first indication information and the first SRS resource set.

Different beams are adopted for SRS transmission on different SRS resources in the target SRS resource set.

Different beamforming weights are adopted for sending SRSs on different SRS resources in the target SRS resource set.

As an embodiment, the first indication information is used to indicate the target SRS resource set, and the operation 230 may include that: the terminal determines the target SRS resource set from the first SRS resource set according to the first indication information, the target SRS resource set being a subset of the first SRS resource set.

The operation that the terminal determines the target SRS resource set from the first SRS resource set according to the first indication information may refer to that the terminal may select from the first SRS resource set a transmission resource belonging to the target SRS resource set according to the target SRS resource set indicated by the first indication information.

For example, the first indication information may indicate the target SRS resource set through a bitmap. Each bit in the bitmap may correspond to an SRS resource, or each bit in the bitmap may correspond to an SRS resource region.

For another example, the first indication information may also indicate the target SRS resource set through an index of an SRS resource in the first SRS resource set.

As an embodiment, the first indication information is used to indicate a first SRS resource in the first SRS resource set, and the operation 230 may include that: the terminal determines the first SRS resource from the first SRS resource set according to the first indication information; and the terminal determines a second. SRS resource set corresponding to the first SRS resource as the target resource set according to the first SRS resource and a corresponding relationship between each SRS resource in the first SRS resource set and a second SRS resource set.

Different SRS resources in the first SRS resource set correspond to different second SRS resource sets.

For example, SRSs are sent on SRS resources in the first SRS resource set through wide beams, the network device may select a wide beam with relatively high SRS transmission quality as the first SRS resource according to the SRSs sent on the SRS resources in the first SRS resource set, and the terminal determines the SRS resource corresponding to at least one narrow beam in the same direction with the wide beam as a transmission resource in the second SRS resource set according to the wide beam.

As an embodiment, the first indication information is used to indicate a second SRS resource in the first SRS resource set, and the operation 230 may include that: the terminal determines an index of the second SRS resource in the first SRS resource set according to the first indication information and the first SRS resource set; the terminal determines an index set corresponding to the second SRS resource according to the index of the second SRS resource in the first SRS resource set and a corresponding relationship between an index of an SRS resource in the first SRS resource set and an index set; and the terminal determines that SRS resources indicated by indexes in the index set corresponding to the second SRS resource form the target SRS resource set.

For example, the index of the first SRS resource in the first SRS resource set is k, the index set corresponding to the index k is {k, k+1, k+2, k+3}, and then the terminal may determine the SRS resource in the second SRS resource set according to each index in the index set.

It is to be noted that the corresponding relationship between the index of the SRS resource in the first SRS resource set and the index set may be pre-configured for the terminal by the network device, or may also be predetermined by the network device and the terminal through a communication protocol. There are no limits made thereto in the embodiment of the application.

In the operation 240, the terminal sends the aperiodic SRS to the network device on an SRS resource in the target SRS resource set.

In the operation 250, the terminal receives second indication information sent by the network device, the second indication information being used to indicate a target SRS resource in the target SRS resource set.

The network device may determine a SRS resource for transmitting a signal better in the target SRS resource set as the target SRS resource according to the aperiodic SRS sent by the terminal in the target SRS resource set, and may indicate the SRS resource to the terminal through the second indication information.

As an embodiment, the operation that the terminal receives the second indication information sent by the network device may include that: the terminal receives DCI used to schedule the uplink signal from the network device, the DCI containing the second indication information.

In the operation 260, the terminal determines a transmission parameter used to transmit an uplink signal according to the target SRS resource.

It is to be noted that the transmission parameter may include at least one of the following parameters: a beamforming weight, precoding indication information, an antenna panel for transmission of an uplink signal, an antenna port for transmission of an uplink signal, a layer number for uplink transmission, a modulation and coding scheme for uplink transmission and the like. There are no specific limits made thereto in the embodiment of the application.

In the embodiment of the application, the terminal may determine the transmission parameter used to transmit the uplink signal according to the target SRS resource, so that the condition in a conventional art that an SRS resource may only be configured to transmit an SRS to estimate a channel state is avoided, the SRS resource may be reasonably used, and SRS resource waste is avoided.

Furthermore, the SRS is sent on the SRS resource in the target SRS resource set for channel estimation, the target SRS resource is determined, and the transmission parameter used for the terminal to transmit the uplink signal is determined according to the target SRS resource, so that improvement in accuracy of the transmission parameter determined by the terminal to transmit the uplink signal is facilitated.

As an embodiment, the transmission parameter is a beamforming weight, and the operation 260 may include that: the terminal determines a beamforming weight for SRS transmission on the target SRS resource as the beamforming weight for transmission of the uplink signal.

The network device may determine the SRS resource for transmitting a signal better in the target SRS resource set as the target SRS resource according to the aperiodic SRS sent by the terminal in the target SRS resource set.

Determining the beamforming weight for SRS transmission on the target SRS resource as the beamforming weight for transmission of the uplink signal is favorable for improving the accuracy of the beamforming weight determined by the terminal to transmit the uplink signal and, meanwhile, obtaining uplink CSI on the basis of the selected beamforming weight.

As an embodiment, the transmission parameter is a precoding matrix, and the operation 260 may include that: the terminal receives first Precoding Matrix Indicator (PMI) information sent by the network device; and the terminal determines the precoding matrix of the uplink signal through a mapping relationship among an antenna port amount, PMI information and a precoding matrix according to an antenna port amount of the target SRS resource and the first PMI information.

As an embodiment, after the operation that the terminal determines the first SRS resource set, the method may further include that: the terminal sends an SRS to the network device on the SRS resource in the first SRS resource set.

The terminal sends the SRS to the network device through the SRS resource in the first SRS resource set such that the network device may perform channel estimation according to the SRS to determine the target SRS resource set.

As an embodiment, the operation that the terminal transmits the SRS on the SRS resource in the first SRS resource set may include that: the terminal transmits the SRS on the SRS resource in the first SRS resource set, the SRS being a periodic SRS or a quasi-persistent SRS.

It is to be noted that, since a general direction of a beam changes slowly, time occupied by each period during which the terminal periodically sends the SRS on the SRS resource in the first SRS resource set may be relatively long, that is, the terminal is not required to frequently send the SRS on the SRS resource in the first SRS resource set, so that the target SRS resource set may be selected with a relatively low resource overhead.

As an embodiment, the operation that the terminal sends the SRS to the network device on the SRS resource in the first SRS resource set may include that: the terminal sends the SRS to the network device on part of antenna ports of the SRS resource in the first SRS resource set.

For example, the terminal may adopt only one antenna port of the SRS resource in the first SRS resource set to transmit the SRS.

The SRS is transmitted on part of antenna ports of the SRS resource in the first SRS resource set, so that the resource overhead for SRS transmission is reduced.

As an embodiment, the operation that the terminal determines the first SRS resource set may include that: the terminal receives configuration information sent by the network device, the configuration information being for configuring the first SRS resource set for the terminal.

As an embodiment, the configuration information is born in high-layer signaling or MAC signaling.

Figure 3:
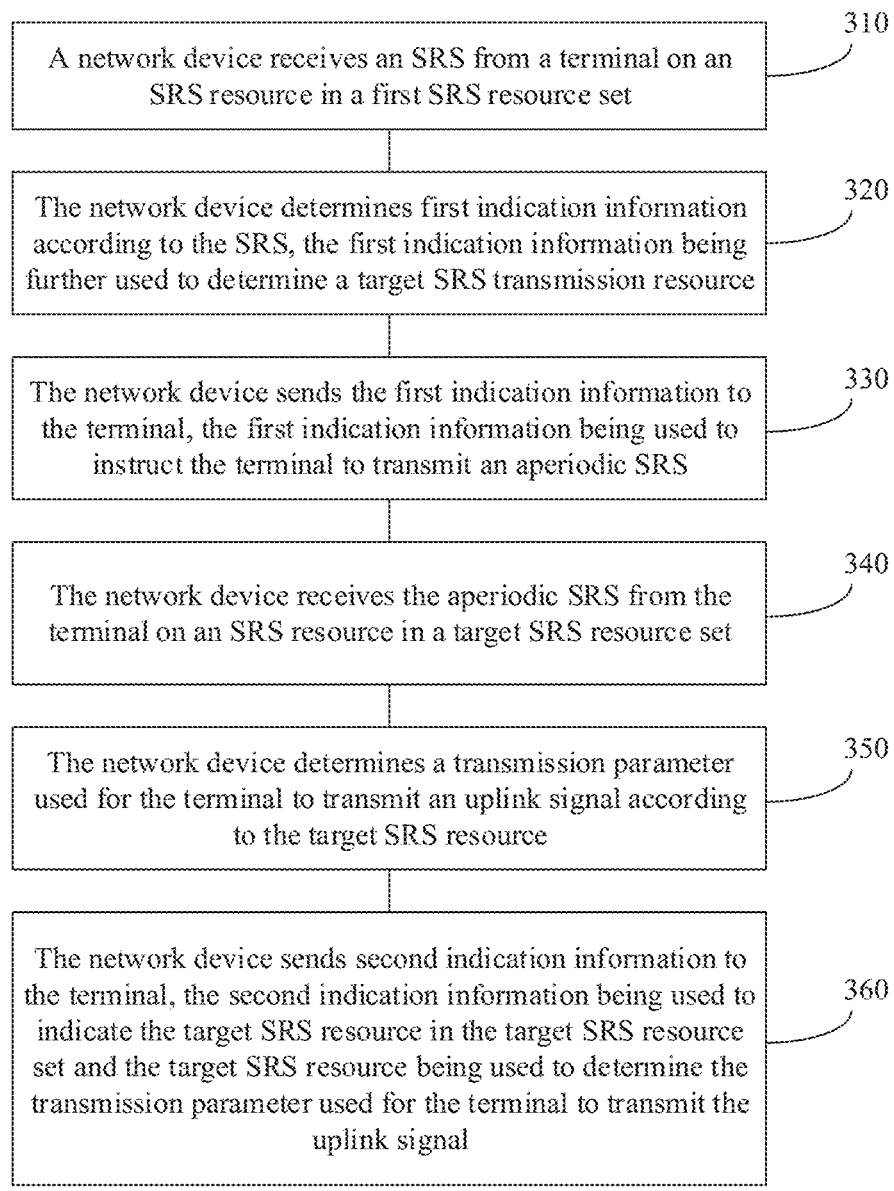
FIG. 3 is a schematic flowchart of a method for determining a transmission parameter of an uplink signal according to an embodiment of the application.

FIG. 3 is a schematic flowchart of a method for determining a transmission parameter of an uplink signal according to an embodiment of the application. The method shown in FIG. 3 includes the following operations.

In the operation 310, a network device receives an SRS from a terminal on an SRS resource in a first SRS resource set.

In the operation 320, the network device determines first indication information according to the SRS, the first indication information being further configured to determine a target SRS transmission resource.

In the operation 330, the network device sends the first indication information to the terminal, the first indication information being used to instruct the terminal to transmit an aperiodic SRS.

In the operation 340, the network device receives the aperiodic SRS from the terminal on an SRS resource in a target SRS resource set.

In the operation 350, the network device determines, according to the target SRS resource, a transmission parameter used for the terminal to transmit a uplink signal.

In the operation 360, the network device sends second indication information to the terminal, the second indication information being used to indicate the target SRS resource in the target SRS resource set and the target SRS resource being configured to determine the transmission parameter used for the terminal to transmit the uplink signal.

In the embodiment of the application, the terminal may determine the transmission parameter used to transmit the uplink signal according to the target SRS resource, so that the condition in a conventional art that an SRS resource may only be configured to transmit an SRS to estimate a channel state is avoided, the SRS resource may be reasonably used, and SRS resource waste is avoided.

Furthermore, the SRS is sent on the SRS resource in the target SRS resource set for channel estimation, the target SRS resource is determined, and the transmission parameter used for the terminal to transmit the uplink signal is determined according to the target SRS resource, so that improvement in accuracy of the transmission parameter determined by the terminal to transmit the uplink signal is facilitated.

As an embodiment, the first indication information is used to indicate the target SRS resource set, and the target SRS resource set is a subset of the first SRS resource set.

As an embodiment, the first indication information is used to indicate a first SRS resource in the first SRS resource set, each SRS resource in the first SRS resource set corresponds to a second SRS resource set, and the second SRS resource set corresponding to the first SRS resource is the target SRS resource set.

As an embodiment, different SRS resources in the first SRS resource set correspond to different second SRS resource sets.

As an embodiment, the first indication information is used to indicate a second SRS resource in the first SRS resource set, an index of the second SRS resource in the first SRS resource set corresponds to an index set, and SRS resources corresponding to indexes in the index set corresponding to the second SRS resource form the target SRS resource set.

As an embodiment, different beams are adopted for SRS transmission on different SRS resources in the first SRS resource set.

As an embodiment, different beams are adopted for SRS transmission on different SRS resources in the target SRS resource set.

As an embodiment, the transmission parameter is a beamforming weight, and a beamforming weight for SRS transmission on the target SRS resource is determined as the beamforming weight for transmission of the uplink signal.

As an embodiment, the transmission parameter is a precoding matrix, and the method may further include that: the network device sends first PMI information to the terminal. The first PMI information and an antenna port amount of the target SRS resource indicate the precoding matrix of the uplink signal through a mapping relationship among an antenna port amount, PMI information and a precoding matrix.

As an embodiment, the operation that the network device receives the SRS from the terminal on the SRS resource in the first SRS resource set may include that: the network device receives the SRS from the terminal on the SRS resource in the first SRS resource set, the SRS being a periodic SRS or a quasi-persistent SRS.

As an embodiment, the operation that the network device receives the SRS from the terminal on the SRS resource in the first SRS resource set may include that: the network device receives the SRS from the terminal on part of antenna ports of the SRS resource in the first SRS resource set.

As an embodiment, the method may further include that: the network device sends configuration information to the terminal, the configuration information being for configuring the first SRS resource set for the terminal.

As an embodiment, the configuration information may be born in high-layer signaling or MAC signaling.

As an embodiment, the operation that the network device sends the second indication information to the terminal may include that: the network device sends DCI used to schedule the uplink signal to the terminal, the DCI containing the second indication information.

The methods for determining a transmission parameter of an uplink signal in the embodiments of the application are described above in combination with FIG. 1 to FIG. 3 in detail. A terminal and network device of the embodiments of the application will be described below in combination with FIG. 4 to FIG. 7 in detail. It is to be understood that the devices shown in FIG. 4 to FIG. 7 may implement each operation in FIG. 2 and FIG. 3 and will not be elaborated herein for avoiding repetitions.

Figure 4:
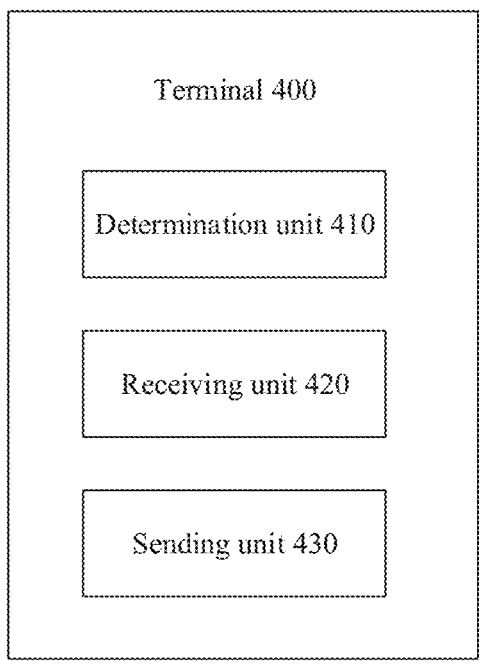
FIG. 4 is a schematic block diagram of a terminal according to an embodiment of the application.

FIG. 4 is a schematic block diagram of a terminal according to an embodiment of the application. The terminal 400 shown in FIG. 4 includes a determination unit 410, a receiving unit 420 and a sending unit 430.

The determination unit is configured to determine a first SRS resource set.

The receiving unit is configured to receive first indication information sent by a network device, the first indication information being used to instruct the terminal to transmit an aperiodic SRS.

The determination unit is further configured to determine a target SRS resource set according to the first indication information and the first SRS resource set.

The sending unit is configured to send the aperiodic SRS to the network device on an SRS resource in the target SRS resource set.

The receiving unit is further configured to receive second indication information sent by the network device, the second indication information being used to indicate a target SRS resource in the target SRS resource set.

The determination unit is further configured to determine a transmission parameter used to transmit an uplink signal according to the target SRS resource.

As an embodiment, the first indication information is used to indicate the target SRS resource set, and the determination unit is configured to determine the target SRS resource set from the first SRS resource set according to the first indication information, the target SRS resource set being a subset of the first SRS resource set.

As an embodiment, the first indication information is used to indicate a first SRS resource in the first SRS resource set, and the determination unit is configured to determine the first SRS resource from the first SRS resource set according to the first indication information and determine a second SRS resource set corresponding to the first SRS resource as the target resource set according to the first SRS resource and a corresponding relationship between each SRS resource in the first SRS resource set and a second SRS resource set.

As an embodiment, different SRS resources in the first SRS resource set correspond to different second SRS resource sets.

As an embodiment, the first indication information is used to indicate a second SRS resource in the first SRS resource set, and the determination unit is configured to determine an index of the second SRS resource in the first SRS resource set according to the first indication information and the first SRS resource set, determine an index set corresponding to the second SRS resource according to the index of the second SRS resource in the first SRS resource set and a corresponding relationship between an index of an SRS resource in the first SRS resource set and an index set, and determine that SRS resources indicated by indexes in the index set corresponding to the second SRS resource form the target SRS resource set.

As an embodiment, different beams are adopted for SRS transmission on different SRS resources in the first SRS resource set.

As an embodiment, different beams are adopted for SRS transmission on different SRS resources in the target SRS resource set.

As an embodiment, the transmission parameter is a beamforming weight, and the determination unit is configured to determine a beamforming weight for SRS transmission on the target SRS resource as the beamforming weight for transmission of the uplink signal.

As an embodiment, the transmission parameter is a precoding matrix, and the determination unit is configured to receive first PMI information sent by the network device and determine the precoding matrix of the uplink signal through a mapping relationship among an antenna port amount, PMI information and a precoding matrix according to an antenna port amount of the target SRS resource and the first PMI information.

As an embodiment, the sending unit is further configured to send an SRS to the network device on the SRS resource in the first SRS resource set.

As an embodiment, the sending unit is further configured to transmit the SRS on the SRS resource in the first SRS resource set, the SRS being a periodic SRS or a quasi-persistent SRS.

As an embodiment, the sending unit is further configured to send the SRS to the network device on pail of antenna ports of the SRS resource in the first SRS resource set.

As an embodiment, the determination unit is further configured to receive configuration information sent by the network device, the configuration information being for configuring the first SRS resource set for the terminal.

As an embodiment, the configuration information may be born in high-layer signaling or MAC signaling.

As an embodiment, the receiving unit is further configured to receive, from the network device, DCI used to schedule the uplink signal, the DCI containing the second indication information.

Figure 5:
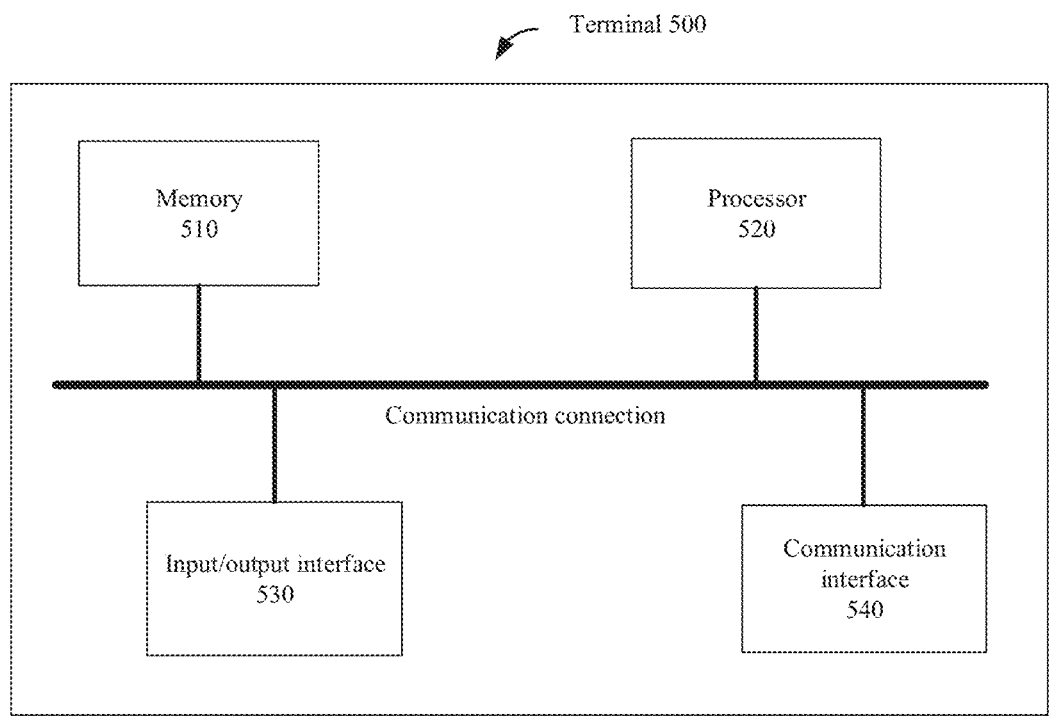
FIG. 5 is a schematic block diagram of a terminal according to another embodiment of the application.

In an optional embodiment, the determination unit 410 may be a processor 520, the receiving unit 420 and the sending unit 430 may be a communication interface 540, and the terminal may further include an input/output interface 530 and a memory 510, as shown in FIG. 5.

FIG. 5 is a schematic block diagram of a terminal according to another embodiment of the application. The terminal 500 shown in FIG. 5 may include a memory 510, a processor 520, an input/output interface 530 and a communication interface 540. Herein, the memory 510, the processor 520, the input/output interface 530 and the communication interface 540 may be connected through an internal connecting path. The memory 510 is configured to store an instruction. The processor 520 is configured to execute the instruction stored in the memory 520 to control the input/output interface 530 to receive input data and information and output data such as an operation result and control the communication interface 550 to send a signal.

The processor is configured to determine a first SRS resource set.

The communication interface is configured to receive first indication information sent by a network device, the first indication information being used to instruct the terminal to transmit an aperiodic SRS, determine a target SRS resource set according to the first indication information and the first SRS resource set, send the aperiodic SRS to the network device on an SRS resource in the target SRS resource set and receive second indication information sent by the network device, the second indication information being used to indicate a target SRS resource in the target SRS resource set.

The processor is further configured to determine a transmission parameter used to transmit an uplink signal according to the target SRS resource.

It is to be understood that, in the embodiment of the application, the processor 520 may be a universal Central Processing Unit (CPU), a microprocessor, an Application Specific Integrated Circuit (ASIC) or one or more integrated circuits, and is configured to execute a related program to implement the technical solution provided in the embodiment of the application.

It is also to be understood that the communication interface 540 uses, for example, but not limited to, a transceiver device such as a transceiver to implement communication between the terminal 500 and another device or a communication network.

The memory 510 may include a read-only memory and a random access memory and provide an instruction and data for the processor 520. A part of the processor 520 may further include a nonvolatile RAM. For example, the processor 520 may further store information of a device type.

In an implementation process, each operation of the method may be completed by an integrated logic circuit of hardware in the processor 520 or an instruction in a software form. The method for determining a transmission parameter of an uplink signal in the embodiments of the application may be directly executed and completed by a hardware processor or executed and completed by a combination of hardware and software modules in the processor. The software module may be located in a mature storage medium in this field such as a random access memory, a flash memory, a read-only memory, a programmable read-only memory or electrically erasable programmable read-only memory and a register. The storage medium is located in the memory 510. The processor 520 may read information in the memory 510 and complete the operations of the method in combination with hardware. No more detailed descriptions will be made herein to avoid repetitions.

Figure 6:
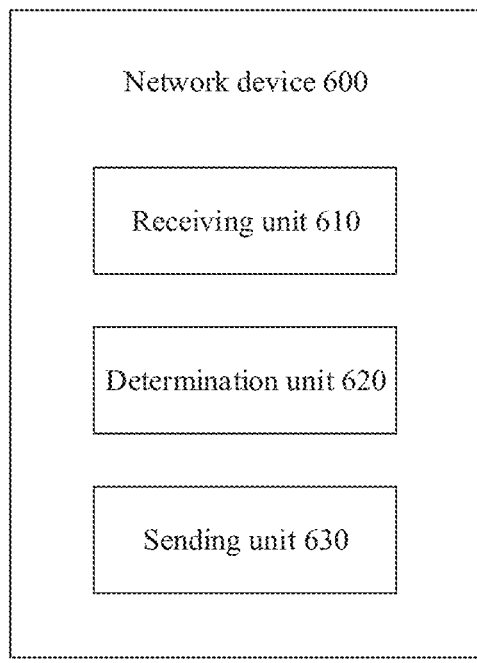
FIG. 6 is a schematic block diagram of a network device according to an embodiment of the application.

FIG. 6 is a schematic block diagram of a network device according to an embodiment of the application. The network device 600 shown in FIG. 6 includes a receiving unit 610, a determination unit 620 and a sending unit 630.

The receiving unit is configured to receive an SRS from a terminal on an SRS resource in a first SRS resource set.

The determination unit is configured to determine first indication information according to the SRS, the first indication information being further configured to determine a target SRS transmission resource.

The sending unit is configured to send the first indication information to the terminal, the first indication information being used to instruct the terminal to transmit an aperiodic SRS.

The receiving unit is further configured to receive the aperiodic SRS from the terminal on an SRS resource in a target SRS resource set.

The determination unit is further configured to determine a transmission parameter used for the terminal to transmit an uplink signal according to the target SRS resource.

The sending unit is further configured to send second indication information to the terminal, the second indication information being used to indicate the target SRS resource in the target SRS resource set and the target SRS resource being configured to determine the transmission parameter used for the terminal to transmit the uplink signal.

As an embodiment, the first indication information is used to indicate the target SRS resource set, and the target SRS resource set is a subset of the first SRS resource set.

As an embodiment, the first indication information is used to indicate a first SRS resource in the first SRS resource set, each SRS resource in the first SRS resource set corresponds to a second SRS resource set, and the second SRS resource set corresponding to the first SRS resource is the target SRS resource set.

As an embodiment, the first indication information is used to indicate a second SRS resource in the first SRS resource set, an index of the second SRS resource in the first SRS resource set corresponds to an index set, and SRS resources corresponding to indexes in the index set corresponding to the second SRS resource form the target SRS resource set.

As an embodiment, different beams are adopted for SRS transmission on different SRS resources in the first SRS resource set.

As an embodiment, different beams are adopted for SRS transmission on different SRS resources in the target SRS resource set.

As an embodiment, the transmission parameter is a beamforming weight, and a beamforming weight for SRS transmission on the target SRS resource is determined as the beamforming weight for transmission of the uplink signal.

As an embodiment, the transmission parameter is a precoding matrix, and the sending unit is further configured to send first PMI information to the terminal. The first PMI information and an antenna port amount of the target SRS resource indicate the precoding matrix of the uplink signal through a mapping relationship among an antenna port amount, PMI information and a precoding matrix.

As an embodiment, the receiving unit is further configured to receive the SRS from the terminal on the SRS resource in the first SRS resource set, the SRS being a periodic SRS or a quasi-persistent SRS.

As an embodiment, the receiving unit is further configured to receive the SRS from the terminal on part of antenna ports of the SRS resource in the first SRS resource set.

As an embodiment, the sending unit is further configured to send configuration information to the terminal, the configuration information being for configuring the first SRS resource set for the terminal.

Figure 7:
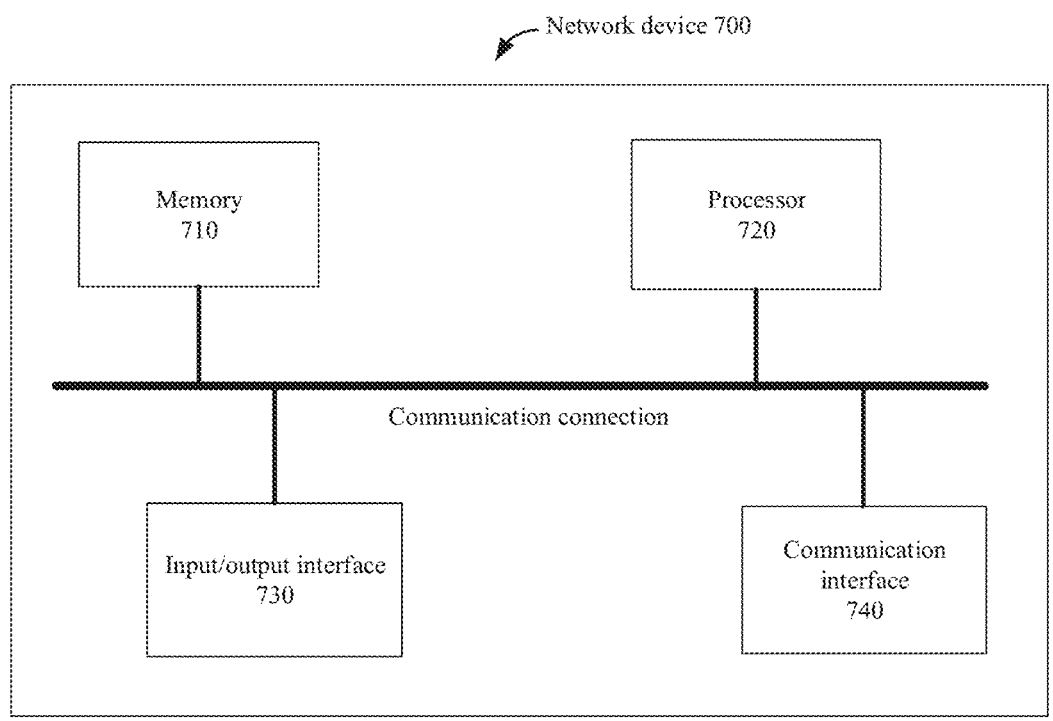
FIG. 7 is a schematic block diagram of a terminal according to another embodiment of the application.

In an optional embodiment, the determination unit 620 may be a processor 720, the receiving unit 610 and the sending unit 630 may be a communication interface 740, and the network device may further include an input/output interface 730 and a memory 710 as shown in FIG. 7.

FIG. 7 is a schematic block diagram of a network device according to another embodiment of the application. The network device 700 shown in FIG. 7 may include a memory 710, a processor 720, an input/output interface 730 and a communication interface 740. Herein, the memory 710, the processor 720, the input/output interface 730 and the communication interface 740 may be connected through an internal connecting path. The memory 710 is configured to store an instruction. The processor 720 is configured to execute the instruction stored in the memory 720 to control the input/output interface 730 to receive input data and information and output data such as an operation result and control the communication interface 770 to send a signal.

The communication interface is configured to receive an SRS from a terminal on an SRS resource in a first SRS resource set.

The processor is configured to determine first indication information according to the SRS, the first indication information being further configured to determine a target SRS transmission resource.

The communication interface is further configured to send the first indication information to the terminal, the first indication information being used to instruct the terminal to transmit an aperiodic SRS, and receive the aperiodic SRS from the terminal on an SRS resource in a target SRS resource set.

The processor is further configured to determine a transmission parameter used for the terminal to transmit an uplink signal according to the target SRS resource.

The communication interface is further configured to send second indication information to the terminal, the second indication information being used to indicate the target SRS resource in the target SRS resource set and the target SRS resource being configured to determine the transmission parameter used for the terminal to transmit the uplink signal.

It is to be understood that, in the embodiment of the application, the processor 720 may adopt a universal CPU, a microprocessor, an ASIC or one or more integrated circuits, and is configured to execute a related program to implement the technical solution provided in the embodiment of the application.

It is also to be understood that the communication interface 740 uses, for example, but not limited to, a transceiver device such as a transceiver to implement communication between the terminal 700 and another device or a communication network.

The memory 710 may include a read-only memory and a random access memory and provides an instruction and data for the processor 720. A part of the processor 720 may further include a nonvolatile RAM. For example, the processor 720 may further store information of a device type.

In an implementation process, each operation of the method may be completed by an integrated logic circuit of hardware in the processor 720 or an instruction in a software form. The method for determining a transmission parameter of an uplink signal in the embodiments of the application may be directly executed and completed by a hardware processor or executed and completed by a combination of hardware and software modules in the processor. The software module may be located in a mature storage medium in this field such as a random access memory, a flash memory, a read-only memory, a programmable read-only memory or electrically erasable programmable read-only memory and a register. The storage medium may be located in the memory 710. The processor 720 may read information in the memory 710 and complete the operations of the method in combination with hardware. No more detailed descriptions will be made herein to avoid repetitions.

It is to be understood that, in the embodiments of the application, "B corresponding to A" represents that B is associated with A and that B may be determined according to A. It is also to be understood that determining B according to A does not mean that B is determined only according to A but that B may also be determined according to A and/or other information.

It is to be understood that term "and/or" in the disclosure is only an association relationship describing associated objects and represents that three relationships may exist. For example, A and/or B may represent three conditions: i.e., independent existence of A, existence of both A and B and independent existence of B. In addition, character "/" in the disclosure usually represents that previous and next associated objects form an "or" relationship.

It is to be understood that, in various embodiments of the application, a magnitude of a sequence number of each process does not mean an execution sequence and the execution sequence of each process should be determined by its function and an internal logic and should not form any limit to an implementation process of the embodiments of the application.

In some embodiments provided by the application, it is to be understood that the disclosed system, device and method may be implemented in other manners. For example, the device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments according to a practical requirement.

In addition, each functional unit in each embodiment of the application may be integrated into a processing unit, each unit may also physically exist independently, and two or more than two units may also be integrated into a unit.

The embodiments may be implemented completely or partially through software, hardware, firmware or any combination thereof. During implementation with software, the embodiments may be implemented completely or partially by a computer program product. The computer program product may include one or more computer instructions. When the computer program instruction is loaded and executed on a computer, the flows or functions according to the embodiments of the application may be completely or partially generated. The computer may be a universal computer, a dedicated computer, a computer network or another programmable device. The computer instruction may be stored in a computer-readable storage medium or transmitted from one computer-readable storage medium to another computer-readable storage medium. For example, the computer instruction may be transmitted from a website, computer, server or data center to another website, computer, server or data center in a wired (for example, coaxial cable, optical fiber and Digital Subscriber Line (DSL)) or wireless (for example, infrared, wireless and microwave) manner. The computer-readable storage medium may be any available medium readable for the computer or a data storage device, such as a server and a data center, including one or more integrated available media. The available medium may be a magnetic medium (for example, a floppy disk, a hard disk and a magnetic tape), an optical medium (for example, a Digital Video Disc (DVD)), a semiconductor medium (for example, a Solid State Disk (SSD)) or the like.

The above is only the specific implementation mode of the application and not intended to limit the scope of protection of the application. Any variations or replacements apparent to those skilled in the art within the technical scope disclosed by the application shall fall within the scope of protection of the application. Therefore, the scope of protection of the application shall be subject to the scope of protection of the claims.

The invention claimed is:

1. A method for determining a transmission parameter of an uplink signal, comprising:
    determining, by a terminal, a first Sounding Reference Signal (SRS) resource set;
    receiving, by the terminal, first indication information sent by a network device, the first indication information being used to indicate the terminal to transmit an aperiodic SRS;
    determining, by the terminal, a target SRS resource set according to the first indication information and the first SRS resource set;
    sending, by the terminal, the aperiodic SRS to the network device on an SRS resource in the target SRS resource set;
    receiving, by the terminal, second indication information sent by the network device, the second indication information being used to indicate a target SRS resource in the target SRS resource set; and
    determining, by the terminal, a transmission parameter used to transmit an uplink signal according to the target SRS resource.

2. The method of claim 1, wherein the first indication information is further used to indicate the target SRS resource set, and
    determining, by the terminal, the target SRS resource set according to the first indication information and the first SRS resource set comprises:
        determining, by the terminal, the target SRS resource set from the first SRS resource set according to the first indication information, the target SRS resource set being a subset of the first SRS resource set.

3. The method of claim 1, wherein the first indication information is further used to indicate a first SRS resource in the first SRS resource set, and
    determining, by the terminal, the target SRS resource set according to the first indication information and the first SRS resource set comprises:
        determining, by the terminal, the first SRS resource from the first SRS resource set according to the first indication information; and
        determining, by the terminal, a second SRS resource set corresponding to the first SRS resource as the target SRS resource set according to the first SRS resource and a corresponding relationship between each SRS resource in the first SRS resource set and the second SRS resource set.

4. The method of claim 3, wherein different SRS resources in the first SRS resource set correspond to different second SRS resource sets.

5. The method of claim 1, wherein different beams are adopted for SRS transmission on different SRS resources in the target SRS resource set.

6. The method of claim 1, wherein the transmission parameter is a beamforming weight, and
    determining, by the terminal, the transmission parameter used to transmit the uplink signal according to the target SRS resource comprises:
        determining, by the terminal, the beamforming weight for SRS transmission on the target SRS resource as the beamforming weight for transmission of the uplink signal.

7. The method of claim 1, wherein the transmission parameter is a precoding matrix, and
    determining, by the terminal, the transmission parameter used to transmit the uplink signal according to the target SRS resource comprises:
        receiving, by the terminal, first Precoding Matrix Indicator (PMI) information sent by the network device; and
        determining, by the terminal, the precoding matrix of the uplink signal through a mapping relationship among an antenna port amount, PMI information and the precoding matrix according to an antenna port amount of the target SRS resource and the first PMI information.

8. The method of claim 1, wherein determining, by the terminal, the first SRS resource set comprises:
    receiving, by the terminal, configuration information sent by the network device, the configuration information being used for configuring the first SRS resource set for the terminal.

9. The method of claim 8, wherein the configuration information is born in high-layer signaling or Media Access Control (MAC) signaling.

10. The method of claim 1, wherein receiving, by the terminal, the second indication information sent by the network device comprises:
    receiving from the network device, by the terminal, Downlink Control Information (DCI) used to schedule the uplink signal, the DCI containing the second indication information.

11. A terminal, comprising:
a processor; and
a communication interface capable of being connected with the processor; wherein
    the processor is configured to determine a first Sounding Reference Signal (SRS) resource set;

the communication interface is configured to receive first indication information sent by a network device, the first indication information being used to instruct the terminal to transmit an aperiodic SRS;

the processor is further configured to determine a target SRS resource set according to the first indication information and the first SRS resource set;

the communication interface is further configured to:
send the aperiodic SRS to the network device on an SRS resource in the target SRS resource set; and
receive second indication information sent by the network device, the second indication information being used to indicate a target SRS resource in the target SRS resource set; and the processor is further configured to determine a transmission parameter used to transmit an uplink signal according to the target SRS resource.

12. The terminal of claim 11, wherein the first indication information is further used to indicate the target SRS resource set, and
the processor is configured to:
determine the target SRS resource set from the first SRS resource set according to the first indication information, the target SRS resource set being a subset of the first SRS resource set.

13. The terminal of claim 11, wherein the first indication information is further used to indicate a first SRS resource in the first SRS resource set, and
the processor is configured to:
determine the first SRS resource from the first SRS resource set according to the first indication information; and
determine a second SRS resource set corresponding to the first SRS resource as the target SRS resource set according to the first SRS resource and a corresponding relationship between each SRS resource in the first SRS resource set and a second SRS resource set.

14. The terminal of claim 13, wherein different SRS resources in the first SRS resource set correspond to different second SRS resource sets.

15. The terminal of claim 11, wherein different beams are adopted for SRS transmission on different SRS resources in the target SRS resource set.

16. The terminal of claim 11, wherein the transmission parameter is a beamforming weight, and
the processor is configured to:
determine the beamforming weight for SRS transmission on the target SRS resource as the beamforming weight for transmission of the uplink signal.

17. The terminal of claim 11, wherein the transmission parameter is a precoding matrix, and
the processor is configured to:
control the communication interface to receive first Precoding Matrix Indicator (PMI) information sent by the network device; and
determine the precoding matrix of the uplink signal through a mapping relationship among an antenna port amount, PMI information and the precoding matrix according to an antenna port amount of the target SRS resource and the first PMI information.

18. The terminal of claim 11, wherein the processor is further configured to:
control the communication interface to receive configuration information sent by the network device, the configuration information being for configuring the first SRS resource set for the terminal.

19. The terminal of claim 18, wherein the configuration information is born in high-layer signaling or Media Access Control (MAC) signaling.

20. The terminal of claim 11, wherein the communication interface is further configured to:
receive, from the network device, Downlink Control Information (DCI) configured to schedule the uplink signal, the DCI containing the second indication information.

* * * * *